United States Patent [19]

Faust et al.

[11] 4,087,360

[45] May 2, 1978

[54] METHOD OF INHIBITING SCALE FORMATION

[75] Inventors: John P. Faust; Henry R. Cramer; John M. Casberg, all of Cheshire, Conn.

[73] Assignee: Olin Corporation, New Haven, Conn.

[21] Appl. No.: 616,118

[22] Filed: Sep. 24, 1975

[51] Int. Cl.$^2$ .................................................. C02B 5/06
[52] U.S. Cl. .................................... 210/58; 25/313 R; 25/217 A; 25/267 E; 210/50; 210/60; 210/169; 252/95; 252/175; 252/187 H
[58] Field of Search ...................... 210/50, 60, 62, 169; 252/95, 187 H; 23/313 R, 267 A, 267 E

[56] References Cited

U.S. PATENT DOCUMENTS

| 3,802,845 | 4/1974 | Tepas, Jr. ..................... 210/169 X |
| 3,846,078 | 11/1974 | Brett ................................. 210/169 |
| 3,878,037 | 4/1975 | Hansen et al. .................. 252/187 H |
| 3,956,165 | 5/1976 | Hansen et al. ................ 252/18712 X |

*Primary Examiner*—Mayer Weinblatt
*Attorney, Agent, or Firm*—James B. Haglind; Donald F. Clements; Thomas P. O'Day

[57] ABSTRACT

Novel compositions comprising calcium hypochlorite and a proportion of a polyacrylic acid compound have been produced. the compositions provide accurately controlled concentrations of available chlorine to bodies of water such as swimming pools by reducing the solubility off the calcium hypochlorite. In addition, when employing dispensers for water soluble chemicals in treating very hard or highly alkaline water, inhibition of scale formation and prevention of scale build-up in the dispenser is achieved when the novel compositions are used.

9 Claims, No Drawings

METHOD OF INHIBITING SCALE FORMATION

This invention relates to the calcium hypochlorite compositions. More particularly, this invention relates to agglomerate calcium hypochlorite compositions containing proportions of a polyacrylic acid compound.

Calcium hypochlorite is a well known source of available chlorine for disinfecting and sanitizing water supplies such as swimming pool water. As a source of available chlorine, the calcium hypochlorite is a highly soluble material which dissolves rapidly in water. For example, at 30° C. about 21.6 grams of granular calcium hypochlorite dissolves in 100 grams of water with all of the calcium hypochlorite dissolving in less than 5 minutes. Thus, solutions of available chlorine can be provided by the direct addition of calcium hypochlorite to the water. Where, however, dilute solutions are required, it is preferred to employ a dispenser which provides limited contact between solid calcium hypochlorite and the water to be treated. Even employing dispensers, however, it is somewhat difficult to supply water solutions where the concentrations of available chlorine are accurately controlled at very dilute concentrations.

Now it has been found that solutions containing available chlorine can be produced from calcium hypochlorite having improved control of the available chlorine concentration, even at very dilute concentrations.

It is known to treat pulp bleaching solutions containing calcium or sodium hypochlorite with a water soluble polymer of acrylic acid as reported in U.S. Pat. No. 3,878,037, G. D. Hanson et al. The bleaching of pulp with hypochlorite solutions is enhanced by the addition of an aqueous solution containing, for example, sodium polyacrylate. The concentrations of hypochlorite used in bleaching solutions are, however, far in excess of those required for example, in sanitizing water supplies such as swimming pool water. In addition, polyacrylates are rapidly destroyed in the presence of available chlorine and ultra-violet light so that direct addition of the polyacrylate to swimming pool water containing hypochlorites is ineffective.

It is therefore an object of the present invention to provide novel calcium hypochlorite compositions for sanitizing water supplies.

A further object of the present invention is to provide novel calcium hypochlorite compositions having reduced solubility for sanitizing water supplies.

It is an additional object of the present invention to provide novel hypochlorite compositions having improved scale inhibiting properties.

Another object of the present invention is to provide a method of reducing scale formation in dispensing apparatus for water treatment chemicals.

These and other objects of the invention will be apparent from the following descriptions of the invention.

It has now been discovered that the aforesaid objects are accomplished by employing agglomerate calcium hypochlorite compositions comprised of calcium hypochlorite and a proportion of a polyacrylic acid compound selected from the group consisting of polyacrylic acid, alkali metal salts of polyacrylic acid, and mixtures thereof. The proportion of the polyacrylic acid compound is from about 0.0001 to about 10 percent by weight of the calcium hypochlorite.

More in detail, the polyacrylic acid compound employed in the novel composition of the present invention includes polyacrylic acid, alkali metal salts of polyacrylic acid, and mixtures thereof. A suitable molecular weight range for the homopolymeric materials is that of from about 700 to about 3000, and preferably from about 900 to about 2700. The polyacrylic acid compounds are readily soluble in water and are available commercially in solid form or as an aqueous solution.

Any suitable alkali metal salt may be employed, for example, sodium polyacrylate, potassium polyacrylate, lithium polyacrylate, cesium polyacrylate and rubidium polyacrylate. For economic reasons, however, it is preferred to use lithium polyacrylate, sodium polyacrylate, and potassium polyacrylate with sodium polyacrylate being particularly preferred.

Calcium hypochlorite is a well know article of commerce. Commercial calcium hypochlorite compositions contain at least about 65% by weight of $Ca(OCl)_2$ and these compositions are quite suitable in preparing the novel compositions of the present invention. Also suitably used are "hydrated" calcium hypochlorite compositions containing at least about 55% by weight of $Ca(OCl)_2$ and having a water content of from about 4 to about 15 percent. These "hydrated" calcium hypochlorite compositions may be prepared by the methods described, for example, in U.S. Pat. No. 3,544,267 issued to G. R. Dychdala or U.S. Pat. No. 3,669,894 issued to J. P. Faust.

The novel agglomerate composition comprising calcium hypochlorite and a polyacrylic acid compound may contain any suitable proportion of the polyacrylic acid compound which is effective in reducing the solubility of the calcium hypochlorite. For example, a proportion of polyacrylic acid compound of from about 0.0001 to about 10 percent by weight of calcium hypochlorite may be employed. Preferably the proportion is from about 0.001 to about 8 percent, and more preferably from about 0.01 to about 3 percent by weight of the calcium hypochlorite.

The novel agglomerate composition of the present invention is in solid form and may be prepared by any of several well known methods including the direct mixing of the components or, by applying a coating of the polyacrylic compound to particles of the hypochlorite salt, for example, by spray graining. While the composition of the present invention may be produced in any suitable form, such as granules, pellets or tablets, it is preferably in the form of pressed tablets.

Calcium hypochlorite is widely used as a disinfectant and sanitizing agent for supplying available chlorine in the treatment of water supplies such as swimming pool water. To sanitize swimming pool water available chlorine concentration ranging from less than 1 part per million to a few parts per million are continually maintained. In conventional methods of application, granular calcium hypochlorite is periodically added directly to the water in the pool in quantities sufficient to maintain the available chlorine at or above the desired levels. It is preferred, however, to provide continuous contact between the pool water and the solid calcium hypochlorite. Placing tablets of calcium hypochlorite in the skimmer or in dissolving baskets around the pool is one method of accomplishing this. Another method is to add solid calcium hypochlorite to a dispensing device in which the calcium hypochlorite is contacted with the water to be treated so that the dissolving of the solid is controlled to form a solution of the desired available chlorine concentration. This concentrated solution is then added to the total body of pool water to provide the desired available chlorine concentration.

Many devices have been developed to control the dissolution of solid compounds containing available chlorine compounds such as calcium hypochlorite. Typical examples include those of U.S. Pat. Nos. 2,700,651; 2,738,323; 3,416,897; 3,495,948; 3,598,536; 3,607,103; 3,615,244; 3,638,833; 3,727,632; 3,802,845; 3,860,394; 3,864,090; and 3,870,471. In each of these devices the contact between the water and the readily soluble solid calcium hypochlorite is controlled either by metering the amount of calcium hypochlorite added to the stream of water or by limiting the degree of contact of the water with the calcium hypochlorite.

While the degree of control of the concentration of available chlorine supplied varies widely in many of the dispensers cited above, accurately controlled concentrations of available chlorine can be supplied by the dispensers of U.S. Pat. Nos. 3,802,845; 3,860,394; and 3,870,471. These dispensers, which are a component of the pool's recirculation system, include an upper chamber and a lower chamber. The upper chamber is divided into a receiving compartment and a dissolving compartment. A rotary receptacle for receiving pool water to be treated is positioned in the receiving compartment. The receptacle is self-emptying when a given weight or volume of water is accumulated. The predetermined amount of water is released to the dissolving compartment to contact calcium hypochlorite particles positioned on a grid. The degree of contact and the contact period are controlled to provide solutions having a wide range of concentrations of available chlorine which are dispensed from the lower chamber. Further details on the control means and operation of these dispensers may be obtained from U.S. Pat. Nos. 3,802,845; 3,860,394; and 3,870,471, the entire disclosures of which are incorporated by reference.

Employing the novel compositions of the present invention in the dispensers described in U.S. Pat. Nos. 3,802,845; 3,860,394; and 3,870,471, it is possible to provide highly accurately controlled concentrations of available chlorine to water solutions, particularly where very dilute concentrations are desired.

The operation of these dispensers in treating pool water is trouble-free where the water hardness is less than about 400 ppm (expressed as calcium carbonate). The U.S. Geological Survey rates water supplies under four classifications for hardness, where the hardness is expressed as calcium carbonate. These classifications are:

Soft Water: under 60 ppm (as $CaCO_3$)
Moderately hard water: 61–120 ppm (as $CaCO_3$)
Hard: 121–180 ppm (as $CaCO_3$)
Very Hard: over 180 ppm (as $CaCO_3$)

Where the water has a hardness in excess of about 400 ppm (as $CaCO_3$) there is a tendency, when using dispensers for calcium hypochlorite, for the formation and build-up scale. Scale build-up is deleterious in that it can block or plug up drains and outlets in the dispenser so that solution flow is deterred or stopped.

It has been found that the use of the novel compositions of the present invention can significantly reduce scale formation in dispensers for calcium hypochlorite where excessively hard water is used. The reduction of solubility and the inhibition of scale formation is accomplished without harmfully affecting other properties of the pool water such as the pH, and thus does not promote the corrosion of metals such as Cu or Al used in components of the pool or the recirculation system.

In addition to reducing the solubility of the calcium hypochlorite, it has been found that the use of the novel composition of the present invention can significantly reduce scale formation in dispensers for calcium hypochlorite. The inhibition of scale formation is accomplished without harmfully affecting other properties of the pool water such as the pH, and thus does not promote the corrosion of metals such as Cu or Al used in components of the pool or the recirculation system. The novel composition of the present invention is compatible with other additives used in the treatment of swimming pool water, for example, algaecides, stabilizing agents such as cyanuric acid, pH adjustment agents, for example sodium bisulfate and sodium carbonate, and heat retaining agents. In addition, there is no harmful build-up of the polyacrylic acid compound in the pool water. The novel composition of the present invention provides effective scale inhibition in dispensers used for water treatment with calcium hypochlorite both efficiently and economically.

The aggregate composition of the present invention is a solid where the term agglomerate includes such suitable forms as granules, pellets or tablets. The compositions may be prepared by any of several well known methods including, for example, the direct mixing of the components or by applying a coating of the polyacrylic compound to particles of calcium hypochlorite, for example, by spray graining. It is preferred that the agglomerate composition be a homogeneous mixture of the calcium hypochlorite and the polyacrylic acid compound in the form of a pellet or tablet.

Calcium hypochlorite is widely used as a disinfectant and sanitizing agent for supplying available chlorine in the treatment of water supplies such as swimming pool water. To sanitize swimming pool water, available chlorine concentration ranging from less than 1 part per million to a few parts per million are continually maintained. In conventional methods of application, granular calcium hypochlorite is periodically added directly to the water in the pool in quantities sufficient to maintain the available chlorine at or above the desired levels. It is preferred, however, to provide continuous contact between the pool water and the solid calcium hypochlorite. Placing tablets of calcium hypochlorite in the skimmer or in dissolving baskets around the pool is one method of accomplishing this. Another method is to add solid calcium hypochlorite to a dispensing device in which the calcium hypochlorite is contacted with the water to be treated to form a concentrated solution of available chlorine.

The novel composition of the present invention is compatible with other additives used in the treatment of swimming pool water, for example, algaecides, stabilizing agents such as cyanuric acid, pH adjustment agents, for example sodium bisulfate and sodium carbonate, bromine compounds such as sodium bromide, and heat retaining agents. In addition, there is no harmful build-up of the polyacrylic acid compound in the pool water.

The following examples are presented to further illustrate the invention without any intention of being limited thereby. All parts and percentages are by weight unless otherwise specified.

EXAMPLE 1

A homogeneous mixture containing 99% by weight of commercial calcium hypochlorite [70% by weight of Ca(OCl)$_2$] and 1% by weight of sodium polyacrylate (molecular weight of about 2500) was prepared. The mixture was then used to form a batch of tablets having a weight of about 5 grams. The tablets were about 0.75 inch in diameter, about 0.42 inch thick and had an average hardness of 8 as determined on a Stokes hardness tester equipped with a heavy duty spring. A portion of this batch of tablets was placed the magazine of a dispenser for water soluble chemicals of the type described in U.S. Pat. No. 3,870,471. A water tank was connected to the dispenser and water at a temperature of 85° F. was supplied at a rate of about 1 quart per minute.

The solution control for the dispenser was set and the dispenser operated for a period of time. The aqueous solution containing available chlorine was collected and the available chlorine concentration determined periodically. The dispenser was operated at three different control settings. The results are reported in Table I.

Comparative Test A

A portion of the commercial calcium hypochlorite containing 70% by weight of Ca(OCl)$_2$ used in Example 1 was tabletted. The tablets were 0.75 inch in diameter, about 0.42 inch thick and had an average hardness of 8 as determined on a Stokes hardness tester equipped with a heavy duty spring. A group of tablets were placed in the magazine of a dispenser for water soluble chemicals identical to the dispenser used in Example 1. The dispenser was connected to the same water tank as employed in Example 1. Water was supplied to the dispenser at a rate of about 1 quart per minute. The procedure of Example 1 was repeated using identical settings for the solution control for the dispenser. Results are reported in Table I.

Table I dramatically illustrates the solubility reducing properties of the tablets containing calcium hypochlorite and sodium polyacrylate over tablets containing calcium hypochlorite alone. The tablets of Example 1 having greatly reduced solubility as shown by the available chlorine concentrations of the solutions produced.

TABLE I

| | Example No. 1<br>Tables Containing<br>99% Calcium<br>Hypochlorite +<br>1% Na<br>polyacrylate<br>(by weight) | Comparative Test A<br>Tables Containing<br>Calcium<br>Hypochlorite |
|---|---|---|
| | Available<br>Chlorine<br>Concentration | Available<br>Chlorine<br>Concentration |
| | Control Setting 2.0 | |
| Time of Sample | | |
| 70 min. | 1.8 ppm | 94 ppm |
| 110 min. | 1.8 ppm | 103 ppm |
| 180 min. | 1.8 ppm | 105 ppm |
| | Control Setting 6.0 | |
| Time of Sample | | |
| 110 min. | 177 ppm | 864 ppm |
| 190 min. | 178 ppm | 926 ppm |
| 235 min. | 199 ppm | 962 ppm |
| 285 min. | 202 ppm | 1042 ppm |
| 330 min. | 210 ppm | 1042 ppm |
| | Control Setting 10.0 | |
| Time of Sample | | |
| 100 min. | 803 ppm | 2477 ppm |
| 180 min. | 745 ppm | 2694 ppm |
| 365 min. | 759 ppm | 2423 ppm |
| 425 min. | 752 ppm | 2668 ppm |
| 455 min. | 738 ppm | 2650 ppm |
| 500 min. | 752 ppm | 2578 ppm |

EXAMPLE 2

A tablet of the batch prepared in Example 1 composed of 99% by weight of commercial calcium hypochlorite and 1% by weight of sodium polyacrylate was placed in a stainless steel mesh basket. The basket was suspended in a container holding 6 liters of water at a temperature of 78° F. A magnetic stirrer was used to agitate the liquid. At 10 minute intervals samples of solution were removed and the available chlorine concentration present determined. The measured available chlorine concentration was compared with the theoretical concentration which would be present when the tablet had completely dissolved to determine the degree to which the tablet had dissolved. After a total of 2.5 hours, it was found that the tablet had dissolved completely.

Comparative Test B

A tablet identical to that used in Comparative Test A, containing 100% by weight of commercial calcium hypochlorite was placed in a stainless steel mesh basket. The procedure of Example 2 was repeated with samples of the solution being tested periodically for available chlorine concentration. After a period of 2.0 hours it was found that the tablet had dissolved completely.

Comparison of the rate of solution of the tablet containing the mixture of commercial calcium hypochlorite having 1% by weight of sodium polyacrylate employed in Example 2 with that of the tablet of commercial calcium hypochlorite used in Comparative Test B shows a reduction of 25 percent in the rate of solution is achieved by the tablet of Example 2.

EXAMPLE 3

A reservoir containing water having a hardness of 200 ppm (expressed as CaCO$_3$), a total alkalinity of 150 ppm (expressed as CaCO$_3$), and a pH of 7.95 was connected to a dissolving flask and to a pump. A tablet (5.3 g) containing 99 percent by weight of commercial calcium hypochlorite [66.86 percent weight by Ca(OCl)$_2$] and 1 percent by weight of sodium polyacrylate (molecular weight of about 2500) was placed in a dissolving flask. The tablet was 0.75 inch in diameter, 0.42 inch thick and had a hardness of 8. Water was pumped to the dissolving flask and recirculated to the reservoir. A sample of water was removed from the reservoir at 5 minute intervals following the addition of a tablet to the dissolving flask. The samples were examined for scale formation as indicated by solution opacity by visually inspecting the samples in the tube having a white background with a black circle centered on this background. The degree of opacity was estimated by observing the clarity of the circle when viewed through the solution. The available chlorine concentration was also determined to provide an indication of the degree of dissolution of the Tablet. The pH of the solution was also measured. The results of the examination and determinations are reported in Table II.

Comparative Test C

The procedure of Example 3 was repeated substituting a 5.6 g tablet containing only commercial calcium hypochlorite [66.86 percent by weight of Ca(OCl)$_2$] of similar size and of the same hardness as the tablet of Example 3. The results of the examination are reported in Table II.

The results reported in Table II show that scale formation in solutions from the composition comprising calcium hypochlorite and sodium polyacrylate is greatly reduced over solutions containing only calcium hypochlorite as indicated by the lower opacity of the solutions of Example 3.

TABLE II

| Time of Sample | Example No. | | | Comparative Test C | | |
|---|---|---|---|---|---|---|
| | Solution Appearance | pH | Avail. Cl. Concentration | Solution Appearance | pH | Avail. Cl. Concentration |
| 5 min. | Clear | 8.30 | 57.2 | Mildly opaque | 8.15 | 95.8 |
| 10 min. | Slight | 8.45 | 117.3 | Opaque | 8.00 | 142.9 |
| 15 min. | Hazey | 8.50 | 137.2 | Very opaque | 7.90 | 171.5 |
| 20 min. | Very Slightly Opaque | 8.55 | 180.1 | Very opaque | 7.90 | 174.4 |

EXAMPLE 4

A dispenser of the type disclosed in U.S. Pat. No. 3,870,471 was filled with tablets containing 99 percent by weight of commercial calcium hypochlorite [70 percent by weight of Ca(OCl)$_2$] and 1 percent by weight of sodium polyacrylate (molecular weight of about 2500). The tablets were identical in size and hardness to those prepared in Example 1. A plastic coupon (1 × 3) was placed in the lower chamber of the dispenser. Synthetic hard water having a total hardness of 525 ppm (expressed as CaCO$_3$) a total alkalinity of 225 ppm (expressed as CaCO$_3$) a pH of 7.7 and at a temperature of 70° F. was continuously fed to the dispenser. After a period of 3 hours and 25 minutes the water flow was stopped and the plastic coupon removed and weighed to determine the amount of scale deposited on the coupon during the operating period. The weight scale formed was determined to be 0.0014 grams.

Comparative Test D

The procedure of Example 3 was repeated. The only change being the substitution of tablets containing only commercial calcium hypochlorite [70 percent by weight of Ca(OCl)$_2$] for the tablets of Example 3. The tablets were identical in size and hardness to the tablets prepared in Comparative Example A. After a period of 3 hours and 25 minutes the plastic coupon was removed and weighed and it was found that 0.1323 grams of scale had been deposited on the plastic coupon.

Comparison of the amount of scale deposited in Example 4 with Comparative Test D shows that scale deposition in Comparative Test D was 9350 percent greater than that in Example 4.

EXAMPLE 5

A 15,000 gallon inground swimming pool having a recirculation system was equipped with a dispensing apparatus of the type disclosed in U.S. Pat. No. 3,870,471 as a component of the recirculation system. The magazine of the dispenser was filled with a portion of the batch of tablets prepared in Example 1 comprising 99 percent by weight of commercial calcium hypochlorite [70 percent by weight of Ca(OCl)$_2$] and 1 percent by weight of sodium polyacrylate (molecular weight about 2500). Three plastic coupons (1 — 3 inches) were weighed and placed in the lower chamber of the dispenser. Pool water was recirculated to the dispenser for a period of 90 days, the recirculation system being operated about 12 hours per day. At the end of each 30 day period, one coupon was removed from the lower chamber and weighed to determine the amount of scale which had been deposited on the coupon during the period of operation. The results of these determinations are reported in Table III. During the 90 day period the dispenser was not cleaned.

TABLE III

| | |
|---|---|
| Pool capacity (gallons) | 15,000 |
| Water Condition | |
| Hardness range (in ppm) | 700–800 |
| Alkalinity range (in ppm) | 50–60 |
| pH range | 7.5–7.8 |
| Temperature range (° F.) | 85–90 |
| Scale accumulation on plastic coupons | |
| After 30 days (g.) | 0.0042 |
| After 60 days (g.) | 0.0132 |
| After 90 days (g.) | 0.0164 |

Comparative Test E

The procedure of Example 5 was repeated with tablets containing only commercial calcium hypochlorite being used in the magazine of the dispenser. The tablets were of the same size, weight and hardness as those employed in Comparative Test A. After a period of about 10 days, scale build-up around the drain between the upper chamber and the lower chamber of the dispenser was sufficient to interfere with the flow of solution to the lower chamber. The dispenser thus had to be cleaned and scale removed. Cleaning of the dispenser was required every 5–10 days to assure the desired flow of solution through the dispenser.

What is claimed is:

1. An agglomerate composition consisting essentially of calcium hypochlorite and a solubility reducing proportion of a polyacrylic acid compound having a molecular weight of from about 700 to about 3000 selected from the group consisting of polyacrylic acid, alkali metal salts of polyacrylic acid and mixtures thereof, wherein said solubility reducing proportion of said polyacrylic acid compound is from about 0.0001 to about 10 percent by weight of said calcium hypochlorite.

2. The agglomerate composition of claim 1 in which said alkali metal salt of polyacrylic acid is selected from the group consisting of sodium polyacrylate, potassium polyacrylate and lithium polyacrylate.

3. The agglomerate composition of claim 2 in which said alkali metal salt of polyacrylic acid is sodium polyacrylate.

4. The agglomerate composition of claim 3 in which said molecular weight of said sodium polyacrylate is from about 900 to about 2600.

5. The agglomerate composition of claim 4 in which said solubility reducing proportion is from about 0.001 to about 8 percent by weight of said calcium hypochlorite.

6. The agglomerate composition of claim 1 wherein said agglomerate is a granule, pellet or tablet.

7. The agglomerate composition of claim 6 wherein said agglomerate is a tablet.

8. A method for inhibiting calcium scale formation in a dispenser for adding calcium hypochlorite to water to form an aqueous solution of calcium hypochlorite, comprising:

adding to said dispenser an agglomerate composition consisting essentially of calcium hypochlorite and a proportion of a polyacrylic acid compound having a molecular weight of from about 700 to about 3000 selected from the group consisting polyacrylic acid, alkali metal salts of polyacrylic acid and mixtures thereof, wherein said proportion of said polyacrylic acid compound is from about 0.0001 to about 10 percent by weight of said calcium hypochlorite, and contacting said agglomerate composition with said water to form said aqueous solution of calcium hypochlorite.

9. The method of claim 8 in which said water has a hardness in excess of 400 parts per million.

* * * * *